Nov. 16, 1965   W. A. REIMER ETAL   3,218,615
MAGNETIC MEMORY SYSTEM AND SOLENOID THEREFOR
Filed May 23, 1962   5 Sheets-Sheet 1

INVENTORS
William A. Reimer
Konstanty E. Krylow
BY
C. A. Gulbrandsen
Atty.

INVENTORS
William A. Reimer
Konstanty E. Krylow
BY
Atty.

Nov. 16, 1965 W. A. REIMER ETAL 3,218,615
MAGNETIC MEMORY SYSTEM AND SOLENOID THEREFOR
Filed May 23, 1962 5 Sheets-Sheet 4

INVENTORS
William A. Reimer
Konstanty E. Krylow
BY
Atty.

United States Patent Office 3,218,615
Patented Nov. 16, 1965

3,218,615
MAGNETIC MEMORY SYSTEM AND SOLENOID THEREFOR
William A. Reimer, Villa Park, and Konstanty E. Krylow, Chicago, Ill., assignors to Automatic Electric Laboratories, Inc., Northlake, Ill., a corporation of Delaware
Filed May 23, 1962, Ser. No. 197,096
5 Claims. (Cl. 340—174)

This invention relates to magnetic memory systems and more particularly to twistor memory systems.

Prior memory systems in this class usually are either of the permanently coded type or of the destructive read out type which require complex control circuits for entering and retrieving information. In the former memory systems coded information once stored in the system is not easily changed thus making the system less flexible than is desirable. In the latter, destructive read out, memory systems separate control circuits are usually required for both entering and retrieving information. The retrieval process usually destroys the stored information making it necessary to temporarily store the retrieved information and then reenter it into the memory.

An advantage of the permanent twistor memory system is simplicity of control circuitry while an advantage of the destructive read out system is flexibility and ease of coding.

Accordingly, it is an object of this invention to provide a semi-permanent twistor memory system that is easily mechanically alterable which requires only simple control circuits.

A feature of this invention is the multi-turn printed wiring solenoid which may be used in a twistor memory array.

In accordance with the principles of this invention, a length of "twistor" material which may be of the type described in the November 1957 issue of The Bell System Technical Journal by A. H. Bobeck, volume XXXVI, pages 1319–1340 is located between a current carrying solenoid and a copper conducting sheet called a "virtual solenoid." The virtual solenoid is not directly electrically connected to either the solenoid or to the length of twistor wire. According to the principle of the virtual solenoid a conducting material flux linked to a current carrying conductor, solenoid in this case, may aid in strengthening the magnetic field on the twistor between the two elements. This added field strength is the result of eddy currents induced by time varying flux linkages between the current carrying conductor and the conducting sheet. Further, according to the principles of this invention, the strength of this added magnetic field may be reduced by punching out an opening in the conducting material immediately above the current carrying conductor.

A length twistor is placed in the magnetic field between the conducting sheet and the solenoid. A sufficient solenoid current will then set up a magnetic field strong enough to change the magnetic state of the twistor while the same current will not cause a change of state if an opening is made in the conducting sheet above the twistor segment. The virtual solenoid is designed into the twistor memory array and coding is accomplished by making openings in the conducting sheet at specified locations.

In this memory system the solenoids used are made by printed wiring techniques. These solenoids are formed of a plurality of turns which do not necessarily form a loop around the twistor but do set up a sufficient field in conjunction with the virtual solenoid to change the magnetic state of the twistor. By using many turns less drive current is required to produce the same field.

The memory system in accordance with this invention is packaged in connected planes called stacks which are then located one upon the other with the aid of interlocking pins to form a memory stack of desired capacity.

This invention will be better understood and further objects and features will become apparent upon reading the following description in which.

In this twistor memory system a solenoid is placed at right angles to a length of twistor wire. The segment of the twistor crossing the solenoid is a bit location or address. The width of the solenoid determines length of twistor coinciding with it and the length of the bit location.

Figure 1:
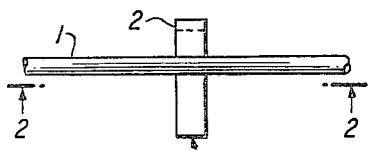
FIG. 1 is a diagrammatic illustration in schematic form of a twistor and a solenoid.
Figure 2:
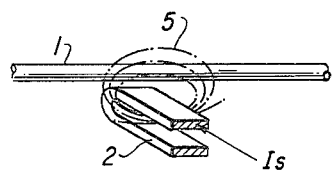
FIG. 2 is a sectional view taken generally along the line 2—2 of FIG. 1 showing the flux-linked twistor and solenoid.

FIGURES 1 and 2 give two views of a twistor 1 placed perpendicular to a solenoid 2. The solenoid current $I_s$ sets up a field 5 linking that segment of the twistor adjacent to the solenoid. It is a property of a twistor that when a strong field is applied to any segment of it that segment can switch from a first magnetic state to a second magnetic state. This change is characterized by a pulse occurring when the magnetic state changes. This pulse may be monitored to determine the condition of the bit location at any time.

Figure 3:
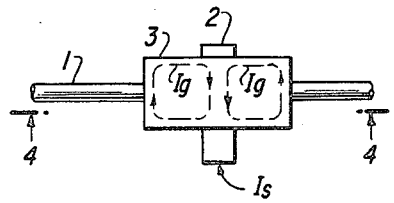
FIG. 3 is a diagrammatic illustration in schematic form of a twistor, a solenoid and a conducting sheet.
Figure 4:
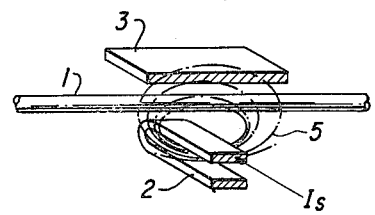
FIG. 4 is a sectional view taken generally along line 4—4 of FIG. 3.

FIGURES 3 and 4 show the arrangement of FIGURE 1 with the single addition of a sheet of conducting material 3 (usually copper), placed such that the twistor lies between the solenoid 2 and the sheet of conducting material 3.

The conducting material is not electrically connected to the other elements but is linked by the field 5 produced by solenoid 2. This conducting sheet, named a virtual solenoid, is, when flux linked to the solenoid, an embodiment of the physical law concerning the generation of induced currents by time changing magnetic flux linkages. The production of such currents, generally called "eddy currents" is described in 20.55 Principles of Electric and Magnetic Circuits, Boast, Harper Bros., 1950 and in other elementary works on magnetics. When the current $I_s$ flows in the solenoid 2, a current $I_g$ is induced in conducting sheet 3.

This induced current $I_g$ flows opposite to current $I_s$ and is most dense in that part of the conducting sheet directly above the solenoid 2. Current $I_g$ produces a field which addes to the solenoid field and assists in switching the twistor from a first magnetic state to a second magnetic state. Thus by using the virtual solenoid as described above the magnetic state of the twistor may be switched with a lower magnitude of solenoid current $I_s$.

Figure 5:
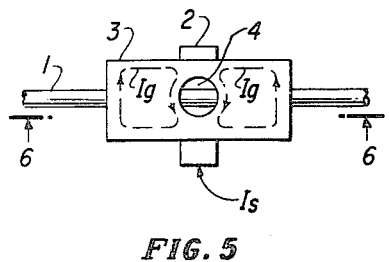
FIG. 5 is a diagrammatic illustration in schematic form of a twistor, a solenoid and a conducting sheet.
Figure 6:
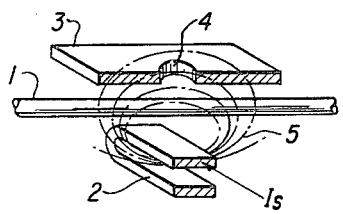
FIG. 6 is a sectional view taken generally along the line 6—6 of FIG. 5.

FIGURES 5 and 6 show the same arrangement shown in FIGURES 3 and 4 with the exception that an opening 4, has been punched in the conducting sheet immediately above the bit location. Placing an opening in the conducting sheet causes the induced current $I_g$ to follow a different path which assures that the field existing at the bit location will be weaker than that which existed before the opening was made in conducting sheet. Thus, it is seen that current $I_s$ must be greater after an opening is made in the conducting sheet in order to produce the same field on the twistor as that needed before the opening existed.

Figure 7:
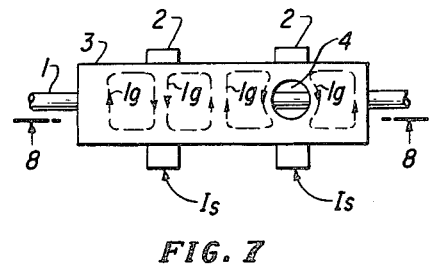
FIG. 7 is a diagrammatic illustration in schematic form of twistors, solenoids, and a conducting sheet.
Figure 8:
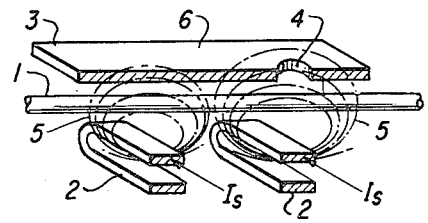
FIG. 8 is a sectional view taken generally along line 8—8 of FIG. 7.

FIGURES 7 and 8 show an embodiment of the virtual solenoid as it is used in a semi-permanent twistor memory system. In this arrangement a conducting sheet 6 extends over first and second solenoids 2. Twistor 1 lies between the conducting sheet and the solenoids. The conducting sheet is punched out above the second solenoid. Under these conditions the solenoid current magnitude and rise time and the opening dimensions may be chosen such that the field generated under the opening at the second solenoid will be insufficient to switch the twistor at that point, while the field under the intact portion at the first solenoid will cause the twistor at that point to switch. Consequently, semi-permanent coding of a twistor memory can be accomplished by making openings in the conducting sheet at specified locations.

The solenoids mentioned above may be of conventional wire wound type but the multi-turn printed wire solenoid as described below is preferable. This type of solenoid may be produced by standard printed wiring techniques. One type of multi-turn-printed wire solenoid is shown in FIGURE 9, another is shown in FIGURE 10.

Figure 9:
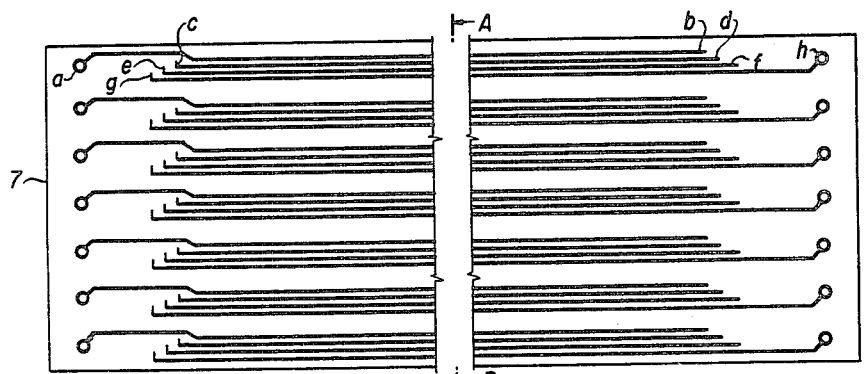
FIGS. 9 and 10 are schematic views of multi-turn printed solenoids.

The solenoid of FIGURE 9 essentially consists of several narrow spaced printed conductors, *ab*, *cd*, *ef*, and *gh*, on a thin plastic strip 7. The solenoid is formed by folding the strip along the perpendicular bisector AB of the conductor and soldering or welding one end of a conductor to the opposite end of the adjacent conductor. Thus, in FIGURE 9 a continuous electrical path with all conductors in series is formed from *a* to *h* by connecting point *b* to *c*, point *d* to *e* and point *f* to *g*. In this way, a four turn solenoid is formed which requires approximately one fourth the solenoid drive current of a single turn unit to produce the same flux density.

Figure 10:
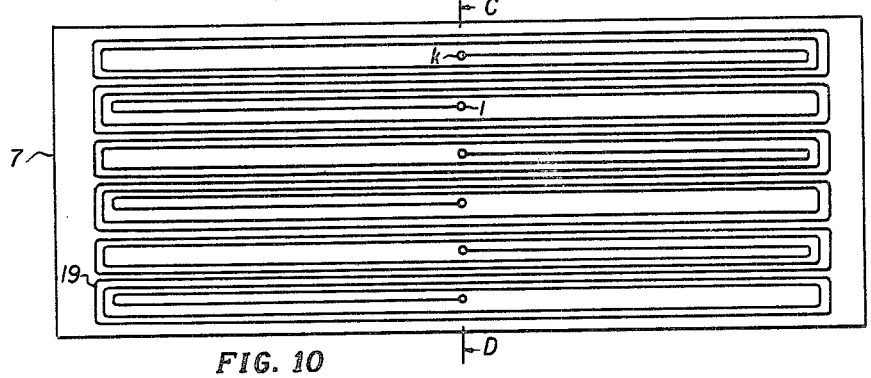

The printed wire solenoid of FIGURE 10 eliminates the need for connecting conductors to form a multi-turn solenoid. Referring to FIGURE 10, one solenoid consists of five conductors in series between the solder pads *k* and *l* and two conductors on the outside of each pad. The five conductors between the pads constitute the solenoid proper while the conductors on the outside of the pads serve as current return paths. In operation with a twistor, the solenoid is laid at right angles to the twistor and folded along the bisector CD of the conductors. Solenoids having this figure-eight configuration have been operated successfully in the semi-permanent twistor memory described herein.

As will be seen from an inspection of FIG. 10 the center leg of the figure-eight formed by five conductors between terminals *k* and *l*—which terminals serve as connecting means for permitting excitation pulses to be driven through this solenoid winding—all carry currents in the same direction and thereby set up a relatively strong field of a predetermined direction at the bit locations defined by the intersection of this center leg with the twistor wires. On the other hand the two return conductors above terminal *k* in FIG. 10 and likewise the two return conductors immediately below terminal *l* set up a relatively weak field of a direction opposite to the above predetermined direction, namely at locations spaced from the bit locations longitudinally of the twistors. These fields due to the return conductors which form the top and bottom legs of the figure-eight are too weak to adversely interfere with the field set up by the five center conductors at the bit location proper. These return conductors actually aid in the setting up of this field and thereby enhance the switching of the magnetic state of the twistors at the bit locations. The reason for this is that the eddy currents induced in the aforementioned virtual solenoid 3, FIGS. 3 to 8, extend over two loop paths one on each side (top and bottom in FIG. 10) of the bit location and the fields due to the above-mentioned two return paths are in the proper direction for the setting up of these induced eddy current loops.

A preferred embodiment of the semi-permanent twistor memory package and its method of assembly is shown in FIGURES 11 through 19. This package comprises a twistor tape termination (FIG. 11) including tape encapsulated twistor wires 8, twistor termination board 9, potting dam 10, and encapsulant 11 (shown in FIG. 12), solenoid plane FIG. 12 including solenoid backing plates 12, multi-turn printed wiring solenoids 13, solenoid plane connector 14, with conducting pins 15 which are later connected to the solenoids to provide access for the driving currents, spacer bars 16, interlock pins 17, holes to accept interlock pins 18, major twistor service loop 19 and minor twistor service loop 20, a solenoid plane code card, FIG. 14, including spacing plate 21, copper coding sheet 22, and holding pins 23, to hold and locate the coding sheet a half word code card, FIG. 15 including spacing plate 21, copper sheet 24, and copper coding inserts 25, in FIG. 18 side supports 26 and spacers 30 and in FIG. 19 circuitry for access to the memory including printed boards 27 and ferrite cores 28 with mounting brackets 29.

Figure 11:
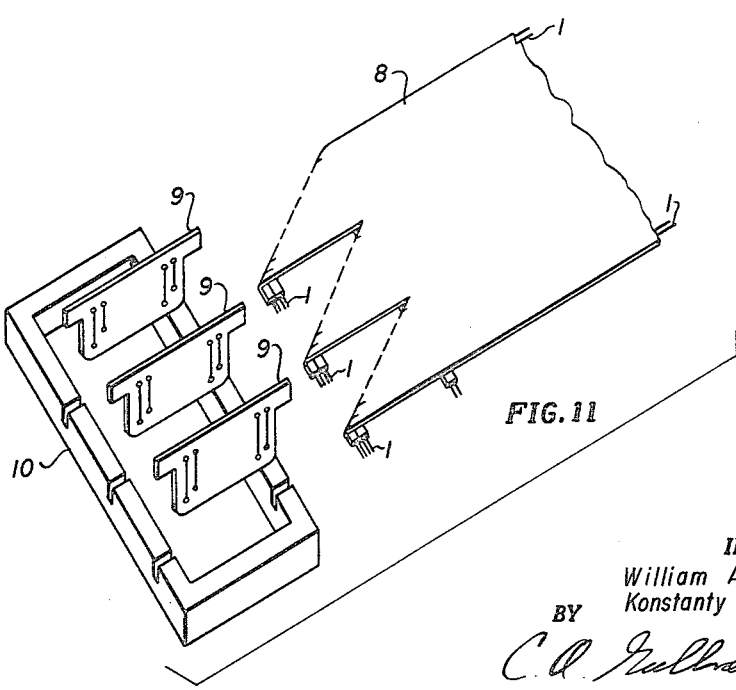
FIGS. 11 to 19 are schematic illustrations of a memory stack in various stages of construction.

The first stage of memory construction is fabrication of the twistor tape termination shown in FIG. 11.

The length of tape-encapsulated twistor 8 needed in a memory of given capacity is calculated according to bit length and spacing required between bits and between stacks. The tapes are cut to length and each tape is terminated at end end in a printed wiring connector 9. The connectors are mounted in a potting dam 10 and all fine wires and their terminations encapsulated. The external connections to the twistor pairs are printed on the connector 9 and are in the area above the encapsulant 11 shown in FIG. 12. In the final assembly, the dams 10 are affixed to the memory.

Figure 12:
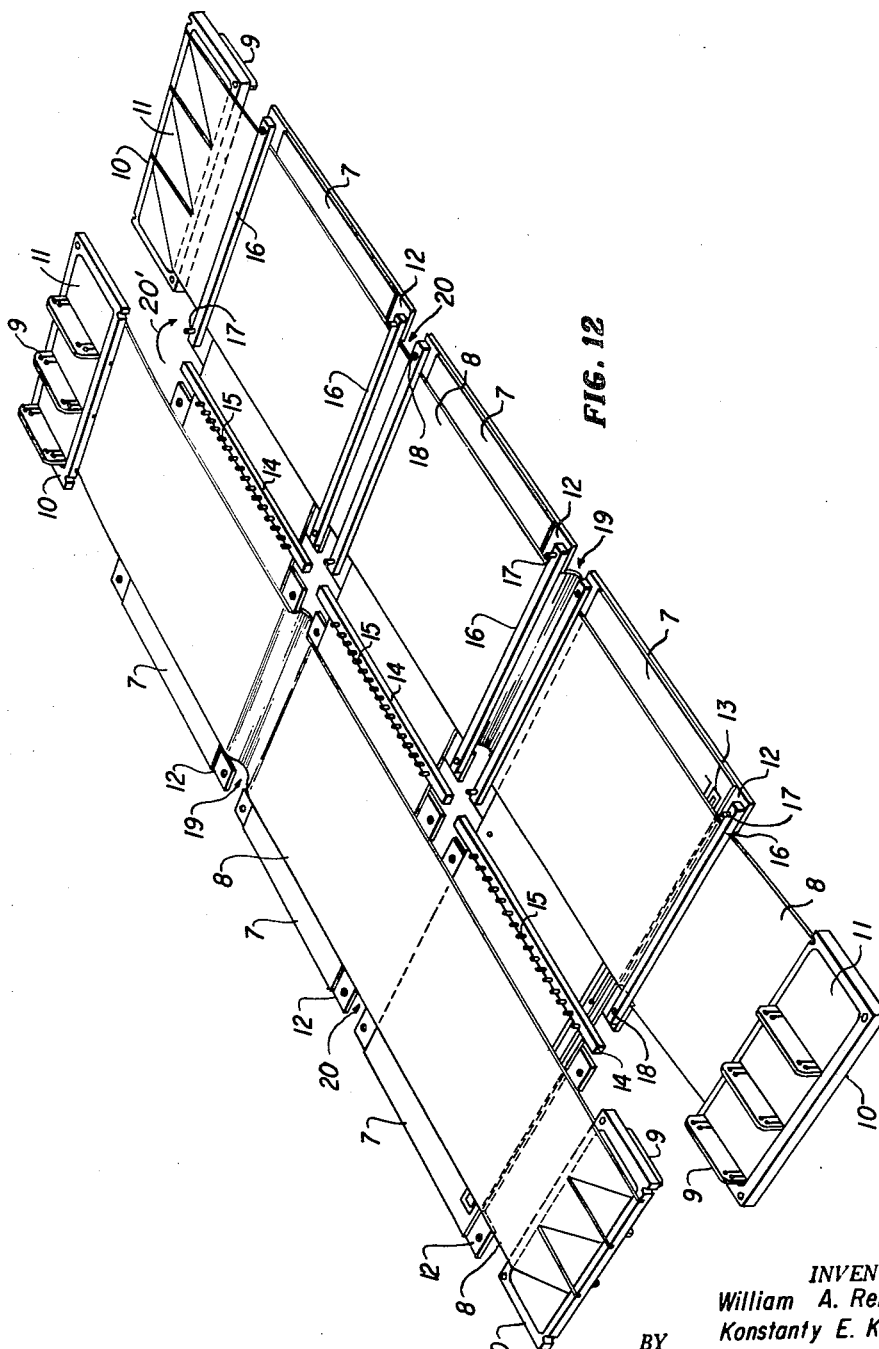

Construction proceeds as shown in FIG. 12. The multi-turn printed wiring solenoids 13 in the memory are glued to two solenoid backing plates 12. Since more than one solenoid is printed on a sheet, the group of solenoids printed on a single flexible sheet forms a solenoid plane. The backing plates 12 provide a rigid support for the flexible solenoid plane as well as accurate location of words in the memory. The distance between the two solenoid backing plates determines the solenoid plane service loop 20'. The solenoid plane connection is made in this service loop area, leaving one end of the memory 31 open for code-card insertion. The solenoid plane connector 14 not only provides electrical connection to the solenoids, but acts as a spacer that separates the solenoid halves by a predetermined distance. In the case of full solenoid plane coding, the connector also acts as a code card stop.

After the solenoid planes 13 are glued in place on the solenoid backing plates 12, the predetermined twistor tapes 8 are glued over both solenoid plane halves. The tapes are located with respect to the solenoid backing plates, thus establishing bit locations. The twistor service loops 19 and 20 are established by the spacing between the solenoid backing plates that the tapes span.

Figure 13:
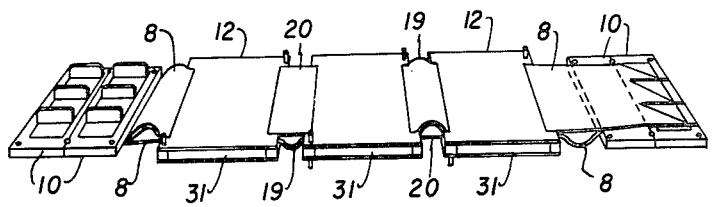
Figure 14:
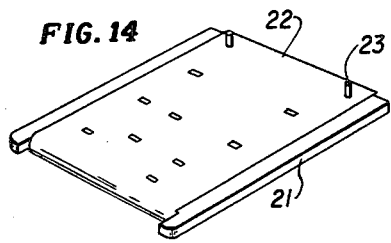
Figure 15:
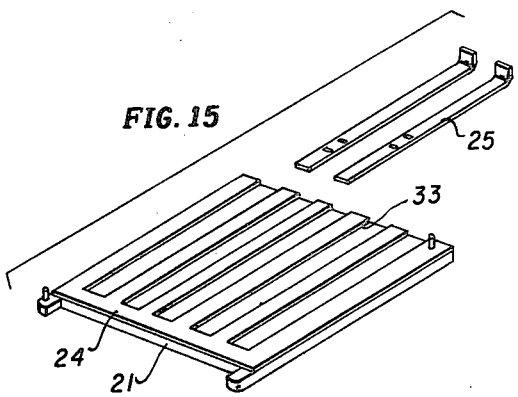
Figure 16:
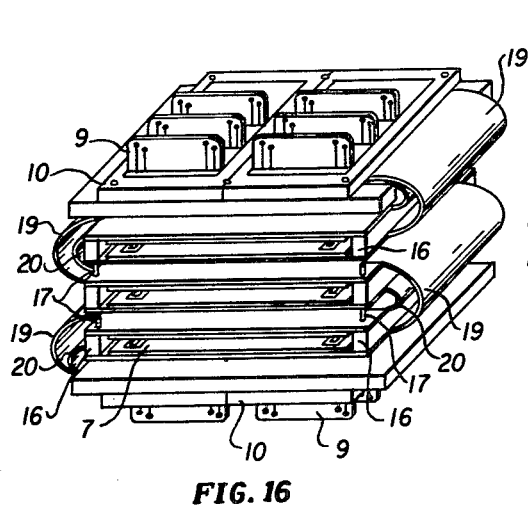

When the tapes are glued in place, the spacer bars 16 with interlock pins 17 are put in place. The coding technique used in the memory determines what part of the memory has the interlock pins. Where a whole solenoid plane is coded at once, FIG. 14, the interlock pins are put in spacer bars that act as guides for the code card. For half word code cards, FIG. 15, the interlock pins are put in the code card. In each case, when the solenoid planes are closed in assembling the stack, interlock pins protrude in every solenoid plane at two corners on a diagonal across the solenoid backing plate. On the other diagonal there are holes in the backing plates and spacers to receive interlock pins. After construction proceeds to the point shown in FIG. 12 the two sides of the solenoids are folded on one another as shown in FIG. 13. The next step is to stack the solenoid planes one on top of the other as shown in FIG. 16.

Figure 17:
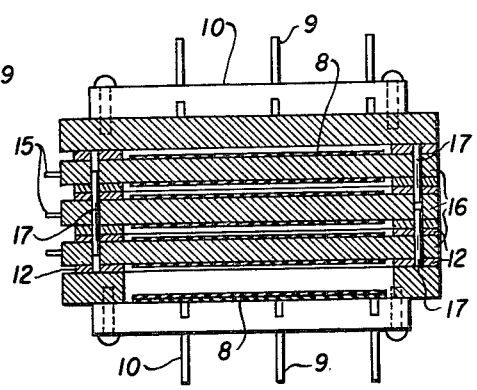

As the solenoid planes are stacked one on top of the other during the third stage of assembly, FIGURE 16, the interlock pins in any given solenoid plane extend into the holes in the planes above and below it as shown in FIGURE 17. Thus, as the memory is assembled the planes are accurately located and lock to one another.

Figure 18:
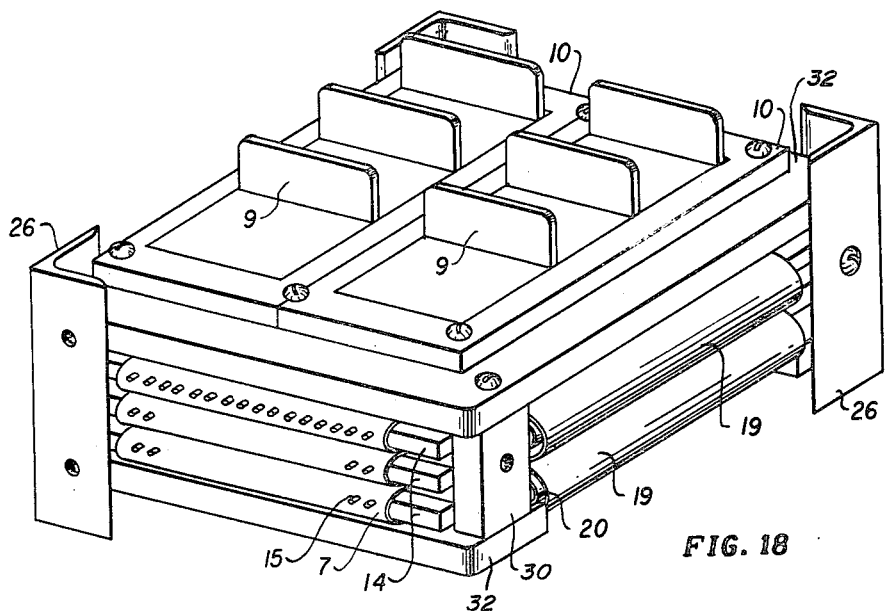

The memory package is locked in place by four side supports 26 shown in FIG. 18 that index to the solenoid backing plates, and by top and bottom plates 32 that mount to the side supports 26. The potting dams 10 are mounted either to the side supports, or to the top and/or bottom plates. The side supports locate the solenoid plane connectors, provide a means for mounting the memory, and protect the twistor tape connectors.

The basic coding operation is accomplished by inserting a punched copper strip 25 in the memory such that the tape-encapsulated twistor 8 is between it and the solenoid 13. As noted above, coding can be accomplished in two ways. Full solenoid plane coding utilizes a punched copper sheet 22, FIG. 14, that wraps around an inserted spacing plate 21. The copper sheet has all the coding for all bit locations in a given solenoid plane. The coding is changed by removing the spacing plate from the memory and either adding punched openings to the copper sheet or putting a different copper sheet with the new coding on the spacing plate. In the case of half word coding, the spacing plate is an integral part of the assembled memory. Punched copper strips insert into the memory and index to guides 33 on the spacing plate. Each strip provides the coding for all the bit locations under one half of one of the solenoids on a solenoid plane.

The basic package as described can be built up in many different ways as dictated by the memory size and optimum packaging density. For large memories, two or more standard solenoid planes can be glued side by side on common solenoid backing plates. Much of the stack hardware is common to all memories where one of the package variables such as word length, backing plate width, etc., is made constant.

Figure 19:
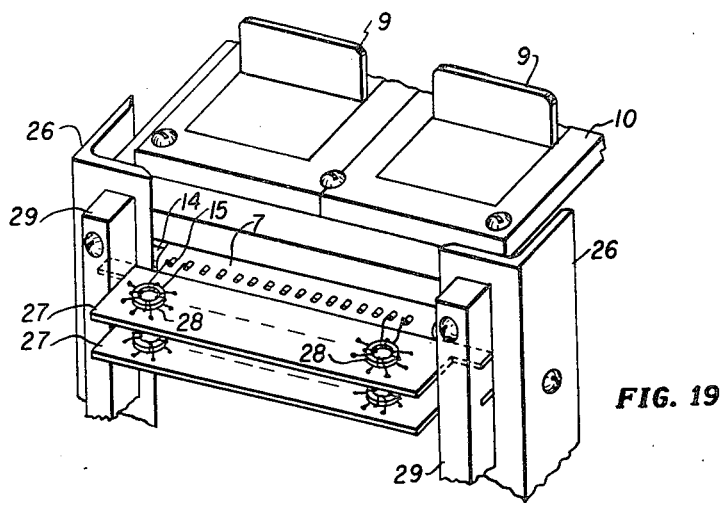

Access to the information is achieved as shown in FIG. 19 by the use of ferrite cores 28 and printed circuit boards 27. By using this method of access a minimum number of connections need be made to the memory.

What is claimed is:

1. A magnetic memory comprising in combination a plurality of elongated magnetic storage elements and at least one solenoid extending transversely and in overlying relation thereto, said solenoid including a substrate of insulating material and an excitation winding having a set of individual turns disposed in coplanar relatively closely spaced relation on said substrate to define storage locations at the intersections between said winding and said elements and having connecting means for permitting an excitation current to be driven serially through said set of coplanar turns so that the current through adjacent ones of said turns of said winding flows in the same direction, thereby to cause, upon excitation of said winding, a change of magnetic state of said elongated storage elements at said locations.

2. In a magnetic memory comprising a plurality of elongated magnetic storage elements and at least one solenoid disposed transversely and in overlying relation thereto, the improvement that each said solenoid includes a substrate of insulating material and an excitation winding of substantially figure-eight configuration carried thereby, each said excitation winding having connecting means for permitting an excitation current to be driven through said winding such that the excitation currents traversing the pair or pairs of winding sections along the center leg of said figure-eight flow in the same direction so as to set up a relatively strong magnetic field at the bit locations defined by each intersection of said center leg with one of said storage elements, while the winding sections along the top and bottom legs of said figure-eight are spaced from the winding sections along said center leg to serve as return paths whereby the winding sections of each said top and bottom legs set up at locations spaced from said bit location longitudinally of the corresponding storage element, a relatively weak field of a direction opposite to said first-mentioned direction.

3. The combination as claimed in claim 2 wherein said connecting means includes a pair of terminals carried by said substrate along a line transverse to said center leg, one of said terminals being disposed between said center leg and said top leg and the other between said center leg and said bottom leg.

4. The combination as claimed in claim 3 wherein each said solenoid comprises two half sections folded longitudinally of said solenoid winding, one over the other, said terminals being aligned substantially along the fold line of said solenoid.

5. The combination as claimed in claim 4 and further comprising a coded conductive sheet positioned on the side of said storage elements opposite to said solenoid to strength the magnetic field at selected ones of said bit locations to a level sufficient to change the magnetic state of said storage elements upon excitation of said solenoid.

References Cited by the Examiner
UNITED STATES PATENTS

| | | | |
|---|---|---|---|
| 3,002,260 | 10/1961 | Shortt et al. | 336—200 |
| 3,011,247 | 12/1961 | Hanlet | 336—200 |
| 3,069,665 | 12/1962 | Bobeck | 340—174 |

IRVING L. SRAGOW, *Primary Examiner.*